(No Model.)
H. C. JOHNSON.
APPARATUS FOR COOLING BEER.
No. 345,059. Patented July 6, 1886.
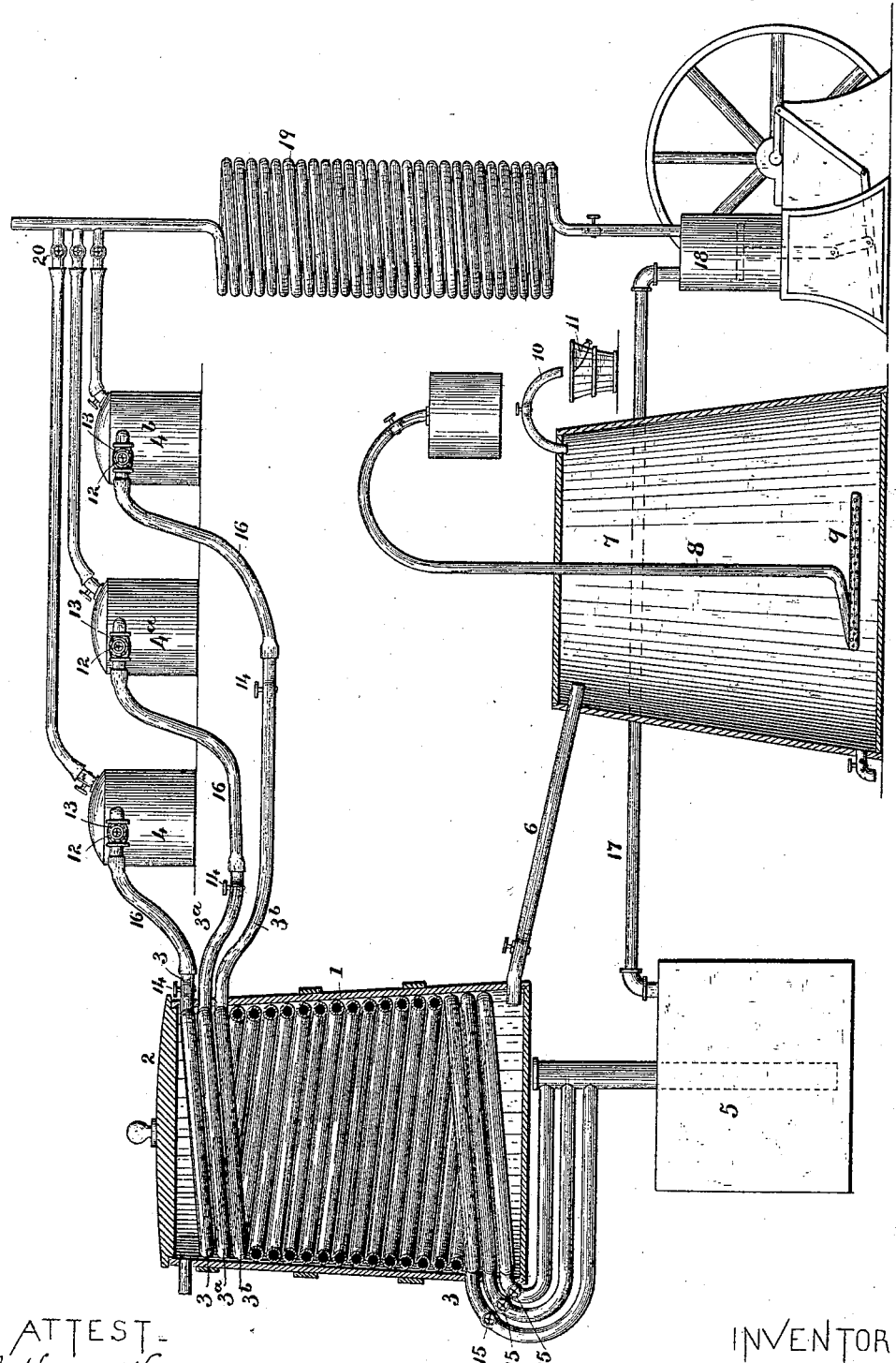
ATTEST
J. Henry Kaiser.
Harry L. Amer
INVENTOR
Henry C. Johnson
By Knight Bros
Attys

UNITED STATES PATENT OFFICE.

HENRY C. JOHNSON, OF MEADVILLE, PENNSYLVANIA, ASSIGNOR TO THE CONSOLIDATED REFRIGERATING COMPANY, OF NEW YORK, N. Y.

APPARATUS FOR COOLING BEER.

SPECIFICATION forming part of Letters Patent No. 345,059, dated July 6, 1886.

Application filed October 29, 1885. Serial No. 181,305. (No model.)

*To all whom it may concern:*

Be it known that I, HENRY CLAY JOHNSON, a citizen of the United States, residing at Meadville, in the county of Crawford and State of Pennsylvania, have invented a new and useful Improvement in Apparatus for Cooling and Aging Beer, of which the following is a specification.

This application is a renewal of or substitute for my application No. 156,894, filed the 24th of February, 1885, and allowed the 14th of April, 1885.

The object of the invention is to produce a beer-cooler that will operate upon a large body of liquid without the necessity of exposing it to evaporation in large shallow pans. To this end I employ a tub, covered to preserve the richness and flavor of the beer and prevent its contamination, and having one or preferably two or more coils of pipe or conduits of any preferred form connected with separate receivers or holders for the ammonia, which is allowed to expand in said pipes with any necessary rapidity of flow, regulated accurately by a valve, and is conducted to a receiving-tank common to all the coils, in which the ammonia is taken up by water for future use. When more convenient, carbonic acid, refrigerated brine, or other well-known cooling medium may be used in the conduit, instead of expanding the ammonia therein. The beer, after it is cooled, may be charged with carbonic-acid gas either in the same vessel or in separate storage-tuns to which it may be transferred from the cooler, the carbonic-acid gas serving to hasten the separation of the yeast and to rapidly bring the beer to a ripened condition, and the yeast being allowed to flow off to a separate vessel preferably without exposing the beer to the atmosphere.

The accompanying drawing is an elevation of an apparatus illustrating the invention, partly in section.

1 represents a large tub, of any necessary capacity, into which the beer is conducted directly from the kettles for cooling, and to prevent atmospheric exposure or evaporation said tub is provided with a cover, 2.

3 3$^a$ 3$^b$ represent separate coils of pipe in contact with the beer, connected with holders 4, 4$^a$, and 4$^b$, respectively, and delivering at their discharge ends into a common water-tank, 5, supplied with water for taking up the ammonia for future use. After being cooled, the beer is conducted by a pipe, 6, into a storage tun or vat, 7, where it is charged with carbonic-acid gas delivered from a pipe, 8, through a rose or other form of distributing-nozzle, 9. The injection of carbonic-acid gas facilitates the separation of the yeast, supplies the place of gas discharged in the working of the beer, and rapidly brings the beer to a ripened condition, fitting it for use. The yeast, as fast as it rises, is carried off through a goose-neck, 10, to a receiver, 11, so as to avoid exposing the beer to the atmosphere or relieving it of pressure. The flow of ammonia through the conduits 3 3$^a$ 3$^b$ is accurately regulated and controlled by valves 12, furnished with dial indicators 13. Separate cocks 14 15 are applied at the respective ends of the cooling-conduits, so as to imprison the cooling agent therein when desired, the holders 4 4$^a$ 4$^b$ being preferably connected with their respective pipes through flexible hose 16, so that they can be detached or separated at will. This device further enables the use of a single gas-holder for a number of coils, into which the cooling medium may be introduced in succession and there held. This expedient is economical with some cooling agents—as, for example, carbonic acid. The intense cold will produce at first a shell of ice around the cooling-pipe, which gradually melts as the heat is taken up in the surrounding body of liquid. Carbonic-acid gas may of course be substituted for ammonia; or, if preferred, brine or other non-freezing liquid refrigerated by the use of ammonia, or in other well-known modes may be passed through the cooling-coils instead of expanding ammonia therein.

For illustration I have shown a compressing apparatus by which the operation may be carried on continuously by the use of either ammonia or carbonic-acid gas. To this end the receiving-tank 5 is connected by a pipe, 17, with an air-pump, 18, of ordinary construction, furnished with customary check-valves and operating to condense the gas into a radiating-coil, 19, from which, after it has become cooled to atmospheric temperature, it is allowed to pass in its compressed state to the holders 4 4ª 4ᵇ under control of cocks 20. The cooling and aging may, if preferred, be performed in one and the same cooling tun or vat, and by the use of compressed carbonic-acid gas expanded directly into the body of liquid, the same medium may be used for cooling and aging the beer at one continuous operation. The brewer will of course employ his skill, knowledge, and judgment in the use of this apparatus as in others.

I am aware that it is common to cool beer by the agency of a coil extending through an open vessel in which the beer is contained. My mode of employing a cooling-conduit in connection with a closely-covered tank in which the beer is contained in bulk is important, for the purpose of preserving the aroma of the beer, and is of still greater importance in preventing the contact of germs and impurities which float in the atmosphere of breweries and are liable to contaminate the beer if it be exposed. This cause explains in large part the difficulties which are well known to exist in summer brewing as now commonly practiced, where the beer is exposed to a warm atmosphere in which these propagating germs are more rife and active.

Having thus described my invention, the following is what I claim as new therein and desire to secure by Letters Patent:

1. The combination of a tightly-closed tank, tun, or vessel for containing beer in bulk and a cooling-coil or equivalent conduit extending through the beer, as herein shown and described.

2. A beer-cooler, constructed as herein described, with a covered tub, a series of cooling-conduits immersed in the liquid to be cooled, separate holders for applying the cooling agent to the said conduits, and a water-tank for taking up the gas for future use.

3. The combination of the tank 1, having a cover, 2, the cooling-coil 3, gas-holder 4, and power-compressing apparatus, substantially as and for the purposes herein set forth.

4. The combination of a tank, 1, having a cover, 2, a cooling-coil, 3, a gas-holder, 4, and a power-compressing apparatus causing a continuous current through the beer, as and for the purposes herein set forth.

HENRY C. JOHNSON.

Witnesses:
GEO. J. GRANT,
GEO. S. ADAMS.